United States Patent [19]

Furutani et al.

[11] Patent Number: 5,285,862
[45] Date of Patent: Feb. 15, 1994

[54] POWER SUPPLY SYSTEM FOR HYBRID VEHICLES

[75] Inventors: Masayuki Furutani, Susono; Yoshiyuki Nakamura; Ryoji Oki, both of Toyota, all of Japan

[73] Assignee: Toyota Jidosha Kabushiki Kaisha, Aichi, Japan

[21] Appl. No.: 28,182

[22] Filed: Mar. 9, 1993

[30] Foreign Application Priority Data

Mar. 16, 1992 [JP] Japan .................. 4-58370
Oct. 2, 1992 [JP] Japan .................. 4-264798

[51] Int. Cl.$^5$ .................. B60L 11/10; B60L 11/18
[52] U.S. Cl. .................. 180/65.4; 318/139
[58] Field of Search .................. 180/65.2, 65.3, 65.4, 180/65.8; 318/139

[56] References Cited

U.S. PATENT DOCUMENTS

| | | | |
|---|---|---|---|
| 4,187,436 | 2/1980 | Etienne | 318/139 X |
| 4,306,156 | 12/1981 | Monaco et al. | 318/139 X |
| 4,313,080 | 1/1982 | Park | 180/65.2 X |
| 4,923,025 | 5/1990 | Ellers | 180/65.4 X |
| 5,212,431 | 5/1993 | Origuchi et al. | 180/65.4 X |

FOREIGN PATENT DOCUMENTS 54-150031 12/1978 Japan.
56-166704 12/1981 Japan.

Primary Examiner—Margaret A. Focarino
Assistant Examiner—Peter English
Attorney, Agent, or Firm—Finnegan, Henderson, Farabow, Garrett, Dunner

[57] ABSTRACT

When voltage at the main battery 10 is lowered, an EV-ECU 36 instructs a starting motor 24 to rotate to actuate an engine 26 for the initiation of power generation. At that time, the starting motor receives electric current mainly from a power capacitor 34, while an auxiliary battery 22 is connected to the ECU 36 and an ECU 38 so that supply voltages at the ECU's 36 and 38 can be kept at a predetermined level irrespective of the drive of the starting motor 24. Also, when the upstream voltage of the auxiliary battery 22 is found to be less than a predetermined value through a comparator 40, the drive of the starting motor is not effected. This configuration prevents the voltage at the auxiliary battery 22 from continuing to be lowered due to the drive of the starting motor 24 in the case where the power capacitor 34 is in a poorly charged state.

7 Claims, 7 Drawing Sheets

POWER SUPPLY SYSTEM FOR HYBRID VEHICLES

BACKGROUND OF THE INVENTION

1. Field of the Invention

The present invention relates to a power supply system for use in a hybrid vehicle in which is mounted an engine for power generation as well as a drive motor for vehicle propulsion, and more particularly, is directed to a drive control of a starting motor for actuating the power generation engine.

2. Description of the Related Arts

A hybrid vehicle taking advantage of both the lower polluting properties peculiar to an electric vehicle and the continuous traveling performance associated with an engine powered vehicle has been hitherto proposed. This type of hybrid vehicle usually travels as an electric vehicle through the drive of a motor by electric power derived from a main battery. Furthermore, the state of charge (hereinafter, abbreviated to SOC) of the battery is monitored during traveling. When the SOC becomes less than a predetermined lower level, the engine is actuated and the vehicle travels while performing power generation. Thus, the main battery is charged with electric current produced by a power generator. When the SOC is restored to a predetermined higher level, the engine is stopped and the hybrid vehicle is allowed to travel as an ordinary electric vehicle.

In this manner, the hybrid vehicle also includes an engine which is driven exclusively for the purpose of charging the battery and hence is operated under a fixed load and a fixed number of revolutions. Therefore, unlike the engine vehicle using the engine as its drive source, there can be realized decreased noise generation and much lower contaminant content in the exhaust gas (Refer to Japanese Patent Laid-open Publication No. 56-166704, for example).

The hybrid vehicle is commonly equipped with an auxiliary battery which provides electric power to an electronic control unit (hereinafter abbreviated as ECU) which carries out a variety of control functions such as control of motor driving conditions and engine starting control, and to accessories such as headlights. The auxiliary battery is adapted to receive electric power from the main battery with the aid of a DC-DC converter.

This auxiliary battery is intended to supply electric power to a starting motor for starting the engine as well. For the drive of the starting motor, the auxiliary battery is required to consume the largest amount of electric power. As described above, the actuation of the engine is carried out depending on the SOC of the main battery. It is therefore ordinarily impossible to control the timing of driving the motor. As a result, the voltage at the auxiliary battery may be disadvantageously substantially lowered when it has been already lowered due to turning on headlights and windshield wipers at night or under rainy weather, or when the starting motor is continuously driven due to failing to actuate the engine.

Hence, there arose a problem that the ECU malfunctions in the case where the voltage at the auxiliary battery is substantially lowered, which results in a poor supply of electric power into the motor.

SUMMARY OF THE INVENTION

The present invention was conceived to overcome the above problems, of the object is to provide a power supply system for a hybrid vehicle capable of securely preventing a malfunction of an ECU.

In order to accomplish the above object, the power supply system for a hybrid vehicle according to a first aspect of the present invention comprises a drive power supply for driving the drive motor; a starting motor for the actuation of the engine; a first power supply means which receives electric power from the drive power supply and provides electric power to the starting motor; a control section which receives electric power from the drive power supply and controls the drive of the starting motor; and a second power supply means which is connected between the drive power supply and the control section in parallel with the control section and maintains supply voltage at the control section.

A power supply system for a hybrid vehicle according to a second aspect of the present invention comprises a drive power supply for driving the drive motor; a starting motor for the actuation of the engine; a first power supply means which receives electric power from the drive power supply and provides electric power to the starting motor; a control section which receives electric power from the first power supply means and controls the drive of the starting motor; a second power supply means which is connected between the first power supply means and the control section in parallel with the first power supply means and maintains supply voltage at the control section; and an isolation means for separating the control section and the second power supply means from the first power supply means at the time of operation of the starting motor.

In a supply system for a hybrid vehicle according to a third aspect of the present invention, at least one of the first and second power supply means comprises a battery.

In a power supply system for a hybrid vehicle according to a fourth aspect of the present invention, there is further provided a voltage detection means for detecting supply voltage at the control section, and the control section prohibits the drive of the starting motor in the case where the supply voltage at the control section detected by the voltage detection means is less than a predetermined value.

In this manner, the present invention includes a couple of power supply means consisting of a first supply means for providing electric power to a starting motor and a second power supply means for maintaining supply voltage at a control section. Due to such construction, the operation of the starting motor is exclusively carried out by electric power derived from the first power supply means so that supply voltage at the control section can be maintained during the operation of the starting motor, thereby preventing a malfunction of the control section.

Furthermore, the present invention may include an isolation means disposed between the first power supply means and the second power supply means. Due to such construction, the control section and the second power supply means are separated from the first power supply means by virtue of the isolation means during the operation of the starting motor while maintaining the supply voltage at the control section by the second power supply means. Accordingly, the supply voltage at the control section can be maintained even though the voltage at the first power supply means is temporarily caused to be lowered, to consequently prevent the control section from malfunctioning. Moreover, in a case where the supply voltage at the control section is less than a predetermined value, the drive of the starting motor is prohibited for further secure prevention of a drop in supply voltage at the control section.

DESCRIPTION OF THE PREFERRED EMBODIMENTS

Figure 1:
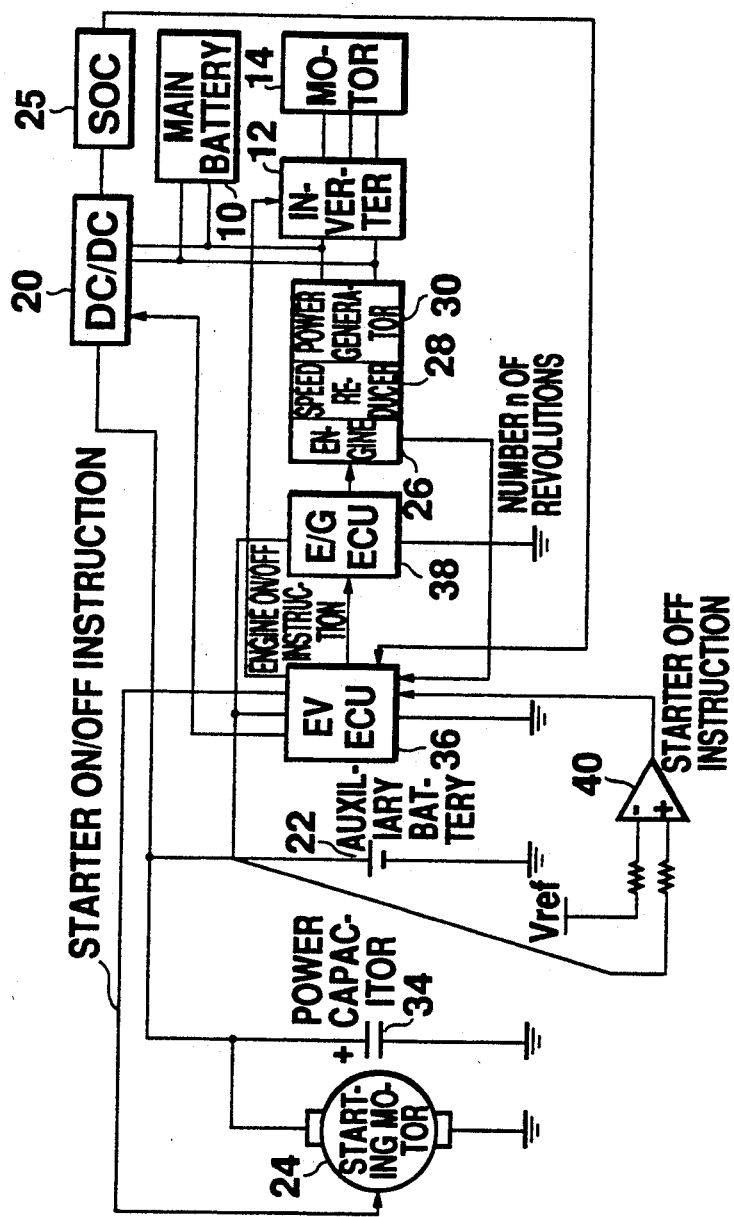
FIG. 1 is a block diagram illustrating an overall configuration of an embodiment of the present invention.

Embodiments of the present invention will now be described with reference to the accompanying drawings. FIG. 1 is a block diagram illustrating an overall configuration of an embodiment. A main battery 10 is connected through an inverter 12 to an alternating-current induction motor 14. Direct-current power derived from the main battery is converted into three-phase alternating-current and supplied to the motor 14 which in turn drives a vehicle.

The main battery 10 is further connected through a DC to DC converter 20 to a power capacitor 34 acting as a first power supply means, so that the power capacitor 34 can be charged with the current delivered from the main battery 10. Incidentally, the voltage of the main battery 10 is ordinarily in the order of 100V, while voltage of the power capacitor 34 is about 12V.

The power capacitor 34 is connected to a starting motor 24 which is mainly driven by electric current supplied from the power capacitor 34. A rotational shaft of the starting motor 24 is drivingly connected to an engine 26 for starting. The engine 26 is linked through a speed reducer 28 to an electric generator 30 so that the rotation of the engine 26 can cause electric power within the generator 30. The output of the generator 30 is connected to the main battery 10 so that the latter can be charged with electric power produced by the generator 30.

The main battery 10 is further connected through the DC to DC converter 20 to an auxiliary battery 22 acting as a second power supply means, and then to an Electric Vehicle-Electronic Control Unit (EV-ECU) 36 and an Engine-Electronic Control Unit (E/G-ECU) 38 each serving as a control section. Thus, the electric power arising from the main battery 10 allows the EV-ECU 36 and E/G-ECU 38 to operate. Voltages at power supplies of the EV-EC S6 and E/G-ECU 38 each being connected to the main battery 10 are intended to be maintained by the auxiliary battery 22.

Therefore, at the time of actuation of the starting motor 24, electric power for driving the starting motor 24 is mainly supplied from the power capacitor 34, while the supply voltages of the EV-ECU 36 and E/G-ECU 38 are kept unvaried by virtue of the auxiliary battery 22, to thereby prevent malfunction of the control sections.

Figure 2:
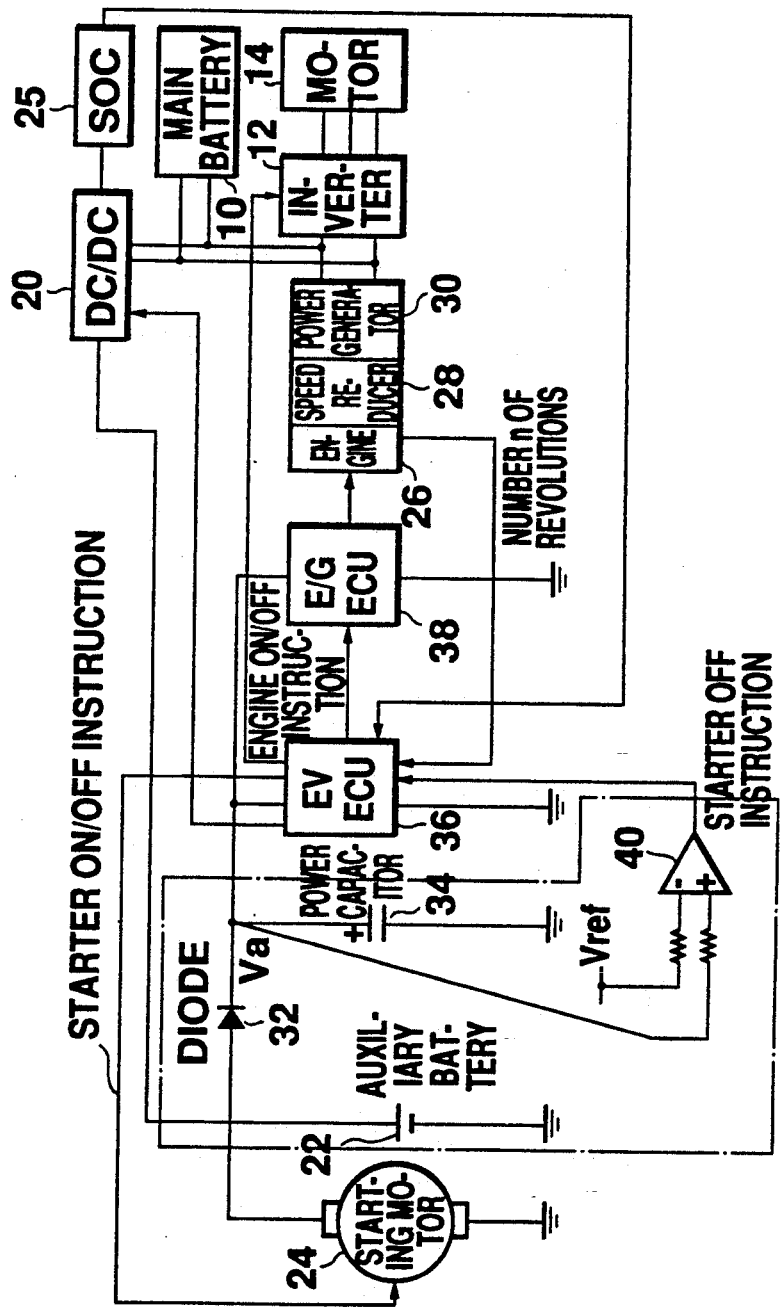
FIG. 2 is a block diagram depicting an overall configuration of another embodiment thereof.

FIG. 2 is a block diagram illustrating a complete configuration of another embodiment of the present invention. In FIG. 2, constituent elements corresponding to those in FIG. 1 are designated by reference numerals identical with those used in FIG. 1. FIG. 2 depicts an auxiliary battery 22 acting as a first power supply means, a power capacitor 34 serving as a second power supply means, and a main battery 10 being connected through a DC to DC converter 20 to the auxiliary battery 22 acting as the first power source means. A starting motor 24 is thus driven by electric current derived from the auxiliary battery 22.

By way of a diode 32 functioning as an isolation means, the auxiliary battery 22 is connected to the power capacitor 34, and then to an EV-ECU 36 and an E/G-ECU 38 each acting as a control section. Accordingly, electric power arising from the auxiliary battery 22 causes the EV-ECU 36 and the E/G-ECU 38 to operate. Furthermore, voltages at power supplies of the EV-ECU 36 and the E/G-ECU 38 each being connected through the diode 32 to the auxiliary battery 22 are maintained by the power capacitor 34. Hence, even if the voltage at the auxiliary battery 22 undesirably drops, the electric current is not permitted to flow from the power capacitor 34 toward the auxiliary battery 22 due to the presence of the diode 32. As a result, supply voltages of the EV-ECU 36 and the E/G-ECU 38 are kept unvaried with the aid of the power capacitor 34, thereby preventing the control sections from malfunctioning.

Moreover, it is preferable in the above embodiments as shown in FIG. 1 and FIG. 2 that the upstream voltage of the second power supply means, that is, the supply voltage at the ECU's 36 and 38, is applied to a comparator 40 acting as a voltage detection means in comparison with a predetermined reference voltage Vref. Then, a signal representing the result of comparison effected by the comparator 40 is supplied to the EV-ECU 36. In addition, an SOC meter 25 is connected to the main battery 10 so as to supply a signal representing a state of charge of the main battery 10 to the EV-ECU 36. Besides, the EV-ECU 36 also receives a signal representing a number n of revolutions of the engine 26.

In such an arrangement, during ordinary traveling, electric current arising from the main battery 10 is supplied through the inverter 12 to the motor 14 whose rotation is used to drive an electric vehicle. In other words, the inverter 12 is controlled by the EV-ECU 36 in response to the state of depressing an accelerator, to rotate the motor 14 at a corresponding rotational speed.

Figure 3:
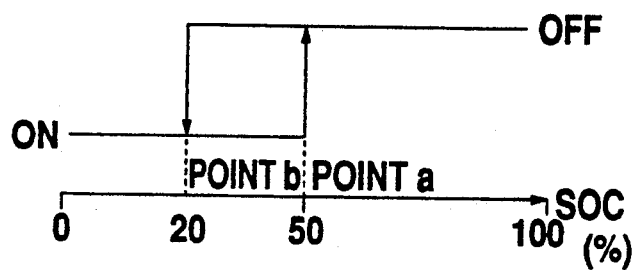
FIG. 3 is an explanatory diagram showing timing of start and stop of power generation.

The state of charge of the main battery 10 is monitored at all times by the SOC meter 25 and the EV-ECU 36 controls the charging into the battery 10 in such a manner that the SOC of the main battery is always within a predetermined range. As seen in FIG. 3, when the SOC reaches, for example, 20% (point b), the generation of electrical energy (charging) is initiated to thereby charge the main battery 10. When the SOC rises to 50% (point a), the generation of electricity is terminated. Hence, the SOC of the main battery 10 is usually set to lie within the range 20 to 50%. It is to be noted that the reason to impart a hysteresis to the on-off control of the power generation is to reduce the number of times starting the engine 26. Also, the values of the SOC at the time when the power generation is started and stopped are not limited to the above-mentioned one, but may lie within a range 20 to 80%. In order to assure an effective reception of charging current which may be supplied into the main battery 10 due to regenerative braking, the SOC on charging is to be less than 100%. Moreover, if the SOC is entirely discharged to 0%, it is impossible for the vehicle to travel, and accordingly the generation of electrical energy may be initiated prior to the completion of discharge.

Figure 4:
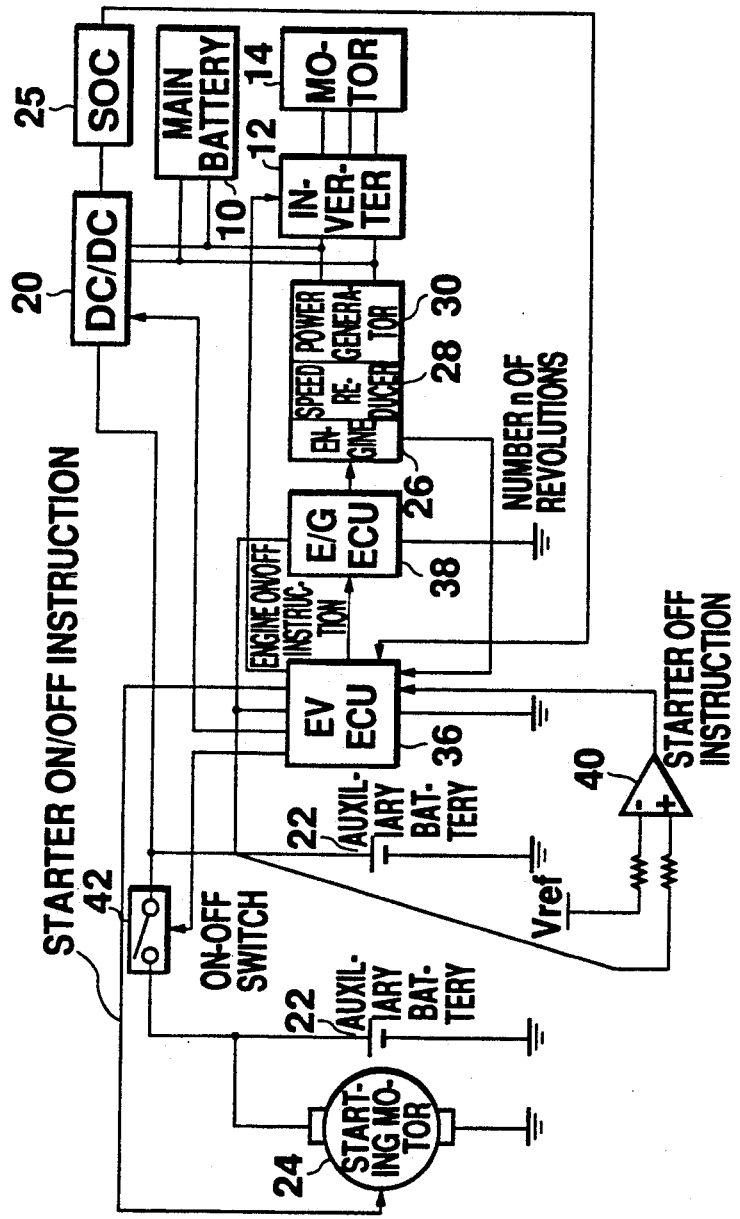
FIG. 4 is a block diagram illustrating an overall configuration of a variant of the embodiment shown in FIG. 1.

A variant of the embodiment shown in FIG. 1 is illustrated in FIG. 4 where a first and a second power supply means both comprise an auxiliary battery 22, and an ON-OFF switch 42 acting as an isolation means is interposed between the two power supply means and connected thereto.

At the time of non-drive of a starting motor 24, the ON-OFF switch 42 is closed to charge the auxiliary battery 22 acting as the first power supply means, while supply voltages at an EV-ECU 36 and an E/G-ECU 38 are maintained by the other auxiliary battery 22 acting as the second supply means.

While on the contrary, at the time of drive of the starting motor 24, the OFF-OFF switch 42 is opened under an instruction issued from the EV-ECU 36 so as to separate the auxiliary battery 22 acting as the first power supply means and the starting motor 24 from the ECU's 36 and 38, thereby preventing the supply voltages at the ECU's 36 and 38 from being lowered due to a voltage drop of the auxiliary battery 22 acting as the first power supply means.

Figure 5:
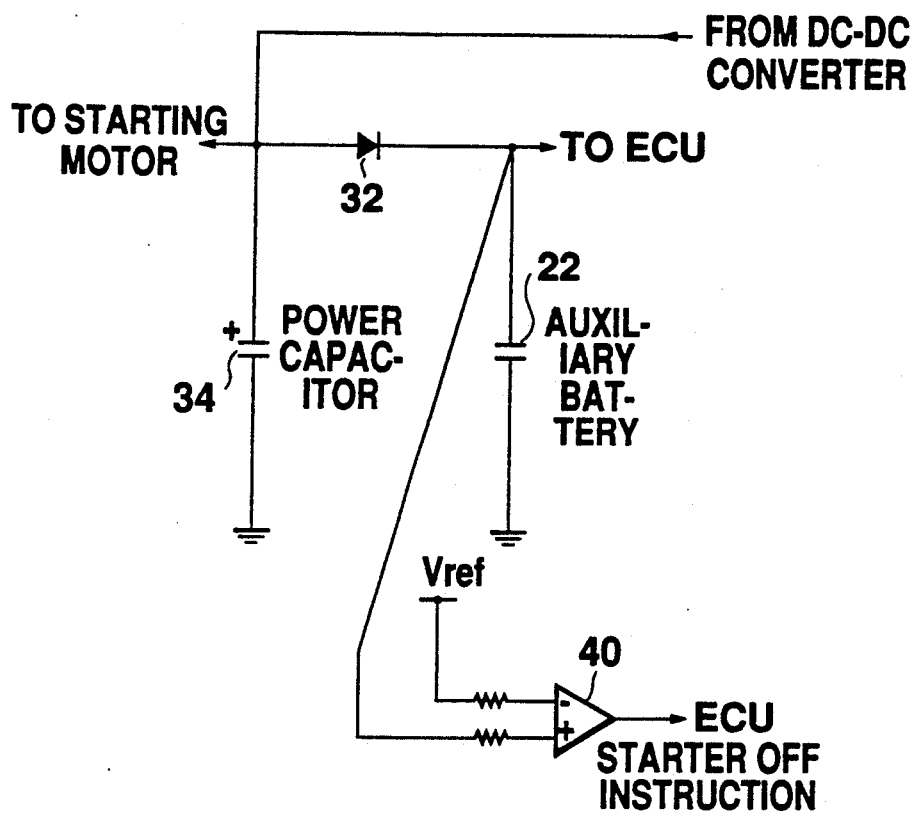
FIG. 5 is a block diagram illustrating a partial configuration of a further embodiment of the part enclosed by a chain line in FIG. 2.
Figure 6:
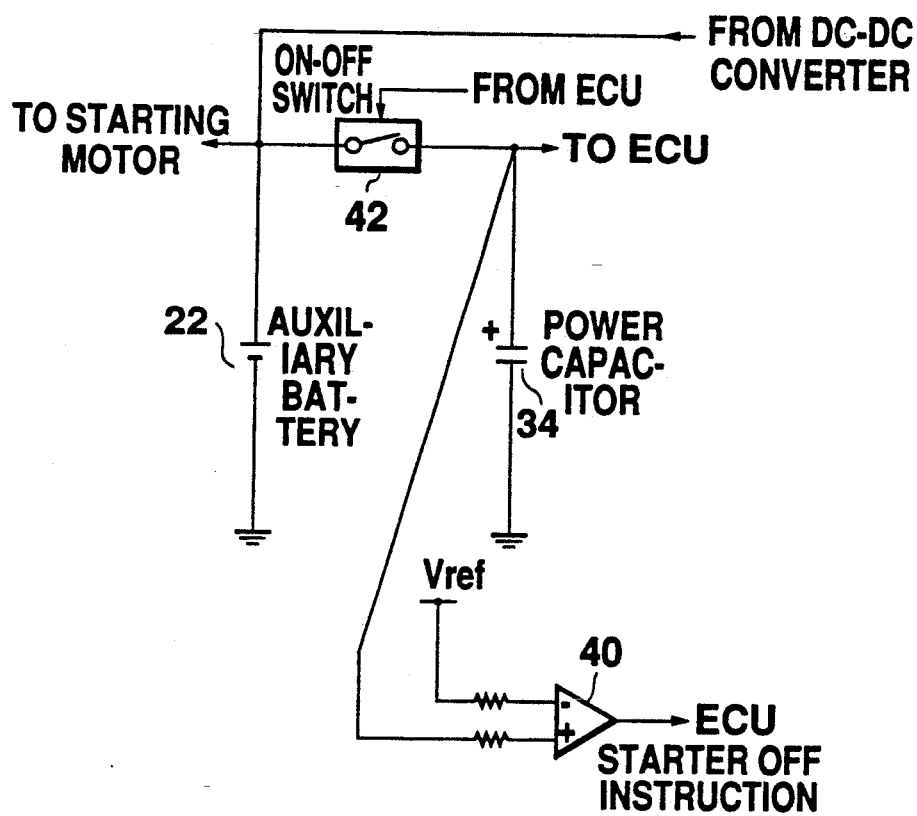
FIG. 6 is a block diagram illustrating a partial configuration of a still further embodiment of the part enclosed by a chain line in FIG. 2.

FIGS. 5 and 6 illustrate further embodiments, respectively, of the area enclosed by a chain line in FIG. 2. FIG. 5 shows an embodiment where an auxiliary battery 22 and an power capacitor 34 acting as a first and a second power supply means, respectively, are interchanged with each other. In this embodiment, a starting motor 24 is driven by electric current derived from the power capacitor 34, while an EV-ECU 36 and an E/G-ECU 38 are operated by electric current from the auxiliary battery 22 having larger capacity than the power capacitor 34. This configuration ensures more stabilized supply voltages at the ECU's 36 and 38.

In the above-described embodiment, one of the first and second power supply means is the auxiliary battery and the other is the power capacitor, but instead, both the power supply means may comprise the auxiliary battery in the same manner as the embodiment shown in FIG. 4.

FIG. 6 depicts an embodiment employing as an isolation means an ON-OFF switch 42 in place of a diode S2. The ON-OFF switch 42 is the same as that used in the FIG. 4 embodiment. With the ON-OFF switch 42 being ordinarily closed, an EV-ECU 36 and an E/G-ECU 38 are operated by electric current derived from an auxiliary battery 22. On the other hand, at the time of drive of a starting motor 24, the ON-OFF switch 42 is opened in compliance with an instruction issued by the EV-ECU 36 so as to separate the ECU's 36 and 38 and a power capacitor 34 from the auxiliary battery 22. In this case, the ECU's 36 and 38 are operated only by virtue of the current from the power capacitor 34, and accordingly, a temporary drop in the voltage at the auxiliary battery 22 arising from the actuation of the starting motor 24 does not lead to a drop in the supply voltages at the ECU's 36 and 38.

Figure 7:
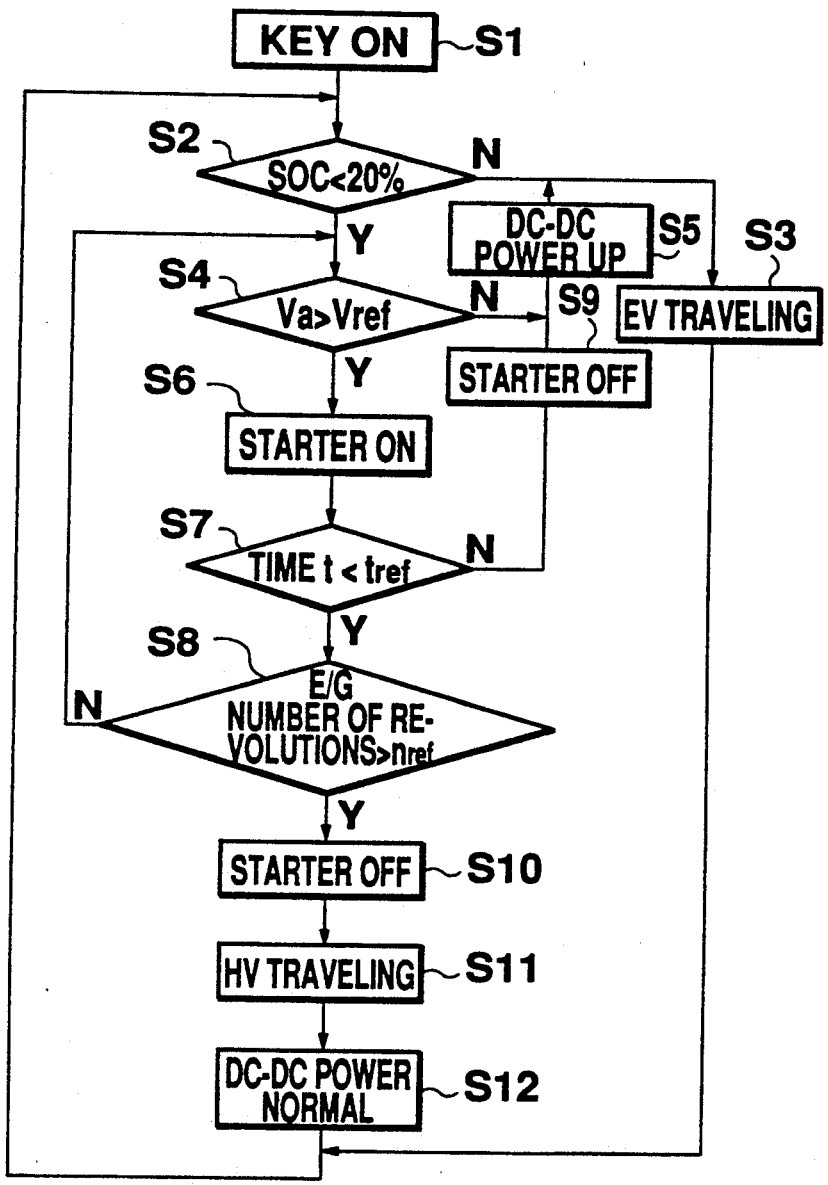
FIG. 7 is a flowchart for explaining the operation at the time of actuating an engine.

Referring next to FIG. 7, the operation of initiating power generation will be described with respect to the embodiment shown in FIG. 2. An ignition key is first switched on (S1). When the vehicle is in operating mode, the EV-ECU 36 receives a detection value from the SOC meter 25 to judge whether it is less than 20% or not (S2). With the SOC not less than 20%, there is no necessity for charging, and hence the motor 14 is driven by electric power derived from the main battery 10 without performing power generation, to thereby allow traveling as an ordinary electric vehicle (EV) (S3).

While on the contrary, with the SOC less than 20%, the EV-ECU 36 receives a detection result from the comparator 40 to judge whether the upstream voltage Va of the power capacitor 34 acting as the second power supply means exceeds the reference value Vref or not (S4). Providing that the supply voltage Va is less than the reference voltage Vref, the power of the DC to DC converter 20 is upped without driving the starting motor 24 (S5). In other words, the fact that the voltage Va on the upstream side of the power capacitor 34 is less than the predetermined value implies a presence of a lower voltage at the auxiliary battery 22 acting as the first power supply means. Therefore, if the starting motor 24 is driven under these conditions, the voltage at the auxiliary battery 22 will be subjected to a further drop. For this reason, during the drive of the starting motor 24, current supply to the power capacitor 34 is not carried out. Accordingly, the upstream voltage of the power capacitor 34 will be further lowered due to the current supply to the ECU's 36 and 38. In the case where the voltage Va does not reach the minimum compensation voltage for the operation of the ECU's 36 and 38, predetermined operations thereof are not to be expected. In this embodiment, therefore, the power of the DC-DC converter 20 is upped to increase the quantity of charging to the auxiliary battery 22, thereby restoring the voltage at the auxiliary battery 22. The restoration of the voltage at the auxiliary battery 22 results in a current supply to the power capacitor 34, thus restoring the upstream voltage Va of the power capacitor 34 exceeding the reference voltage Vref.

While on the contrary, if the voltage Va is more than the reference voltage Vref, the power capacitor 34 is in a fully charged condition, and hence the starting motor is turned on (S6). That is, the starting motor 24 is driven by the power supply from the auxiliary battery 22 to actuate the engine 26. In this case, although the actuation of the starting motor 24 may bring about a drop in voltage at the auxiliary battery 22, the presence of the diode 32 serving as an isolation means prevents the flow of electric current from the power capacitor 34 toward the auxiliary battery. As a result, the electric power being accumulated within the power capacitor 34 maintains the supply voltages at the ECU's 36 and 38 so as to prevent a malfunction of the ECU's 36 and 38. This necessitates the power capacitor 34 having sufficient capacity to operate the ECU's 36 and 38 for a period of time corresponding to one drive period for the ordinary starting motor.

Then, whether a given period of time $t_{ref}$ has elapsed (S7), and whether the number of revolutions of the engine 26 has reached a given reference number $n_{ref}$ of revolutions are judged. The reference number $n_{ref}$ is provided for judging whether the engine has started or not. The number of revolutions of the engine 26 exceeding the reference number of revolutions signifies that the engine has started. Unless the reference number of revolutions has been accomplished, the procedure returns to S6 by way of S4 to continue the rotation of the starting motor. On the other hand, the lapse of the period of time exceeding the reference period of time $t_{ref}$ in S7 signifies that the engine has not yet started in spite of the rotation of the starting motor 24 during the period of time exceeding the reference period of time. Hence, the starting motor is deenergized (S9), and the power of the DC to DC converter 20 is upped (S5) to enable the hybrid vehicle to travel as an electric vehicle (S3).

While on the contrary, providing the number n of revolutions of the engine surpasses the reference number $n_{ref}$ in S8 and the engine 26 has started up, the starting motor 24 is switched off (S10) to actuate the engine while supplying the electric power from the power generator 30 to the main battery 10 for traveling (S11). Then, the power of the DC-DC converter 20 is restored to its original level (S12).

In this manner, the traveling as a hybrid powered vehicle while performing power generation contributes to a restoration of the SOC of the main battery 10. Accordingly, when the SOC of the main battery 10 has reached a predetermined value as described above, the EV-ECU 36 issues an engine stop instruction to the E/G-ECU 38 which in turn brings the engine 26 to a standstill.

According to the arrangement of this embodiment, thus, in the case of lower supply voltages at the ECU's 36 and 38, the starting motor 24 is not allowed to be furnished with electric current, thereby preventing the supply voltages at the ECU's 36 and 38 from being lowered to a level below the predetermined value. Furthermore, the increase of electric charge to be accumulated in the auxiliary battery 22 in this case makes it possible to restore the voltage at the auxiliary battery, thereby driving the starting motor 24 to ensure hybrid vehicle traveling. Thus, the SOC of the main battery 10 is capable of being properly restored.

As detailed hereinabove, a power supply apparatus for a hybrid vehicle according to the present invention comprises a couple of power supply means consisting of a first power supply means for providing electric power to the starting motor and a second power supply means for maintaining the supply voltage at the control section, and an optional isolation means for keeping the supply voltage at the control section within a predetermined range, thereby preventing a drop in voltage at the control section during the supply of electric power into the starting motor. Also, if the supply voltage at the control section is below the predetermined value, the drive of the starting motor is prohibited to place a further reliable restraint on the drop in the supply voltage at the control section.

What is claimed is:

1. A power supply system for use in a hybrid vehicle including an engine for power generation as well as a drive motor for vehicle propulsion, comprising:
   a drive power supply for driving said drive motor;
   a starting motor for the actuation of said engine;
   a first power supply means which receives electric power from said drive power supply and provides electric power to said starting motor;
   a control section which receives electric power from said drive power supply and controls the drive of said starting motor; and
   a second power supply means which is connected between said drive power supply and said control section in parallel with said control section and maintains supply voltage at said control section.

2. A power supply system for a hybrid vehicle according to claim 1, further comprises an isolation means for separating said starting motor and said first power supply means from said control section and said second power supply means at the time of operation of said starting motor.

3. A power supply system for a hybrid vehicle according to claim 1, further comprising a voltage detection means for detecting supply voltage at said control section, wherein
   said control section prohibits the drive of said starting motor in the case where said supply voltage at said control section detected by said voltage detection means is less than a predetermined value.

4. A power supply system for a hybrid vehicle according to any one of claims 1 to 3, wherein
   at least one of said first and second power supply means comprises a battery.

5. A power supply system for use in a hybrid vehicle including an engine for power generation as well as a drive motor for vehicle propulsion, comprising:
   a drive power supply for driving said drive motor;
   a starting motor for the actuation of said engine;
   a first power supply means which receives electric power from said drive power supply and provides electric power to said starting motor;
   a control section which receives electric power from said first power supply means and controls the drive of said starting motor;
   a second power supply means which is connected between said first power supply means and said control section in parallel with said first power supply means and maintains supply voltage at said control section; and
   an isolation means for separating said control section and said second power supply means from said first power supply means at the time of operation of said starting motor.

6. A power supply system for a hybrid vehicle according to claim 5, further comprising a voltage detection means for detecting supply voltage at said control section, wherein
   said control section prohibits the drive of said starting motor in the case where said supply voltage at said control section detected by said voltage detection means is less than a predetermined value.

7. A power supply system for a hybrid vehicle according to claim 5 or 6, wherein
   at least one of said first and second power supply means comprises a battery.

* * * * *